June 27, 1939.   L. SANDERS   2,163,917

OFFSET DISK HARROW

Filed June 9, 1938

INVENTOR.
LORNE SANDERS

BY

ATTORNEYS

Patented June 27, 1939

2,163,917

UNITED STATES PATENT OFFICE 2,163,917

OFFSET DISK HARROW

Lorne Sanders, Redlands, Calif., assignor to Killefer Manufacturing Corporation, Los Angeles, Calif., a corporation of California Application June 9, 1938, Serial No. 212,761

8 Claims. (Cl. 55—83)

The present invention relates generally to offset disk harrows of the type comprising a pair of gangs pivotally connected together to operate in tandem relation at such an angle of divergence between the gangs that they trail behind the tractor or other draft means offset to right or left from the fore and aft center line of the tractor. More specifically, my invention comprises an improvement in an offset harrow of the type disclosed in an application by Rollie H. Mitchell and Oscar W. Sjogren, Serial No. 77,974, filed May 5, 1937, to which reference is hereby specifically made.

The harrow disclosed in the above mentioned application is provided with holding means for normally securing the gangs in any predetermined angular relation including a longitudinally extending bar pivoted to the right end of the rear member and secured at its forward end to the right end of the front gang by a latch. A chain is connected to the tractor at a point offset to the left of the center line thereof and is secured to a lever arm mounted on the left front corner of the front gang, the latter being connected by a rock shaft to the latch at the opposite end of the front gang. When the tractor makes a right turn, the chain tightens, thereby actuating the lever arm to automatically release the latch, and continued pull on the chain angles the gangs in the opposite direction with the point of convergence at the right, thus facilitating a right turn, as is well known.

I have observed that under certain conditions, as for example, when the harrow is drawn in offset relation to the left of the center line of the tractor in some kinds of soil with the gangs normally converging toward the left, that there is some advantage in connecting the chain to pull on the right end of the rear gang rather than on the left end of the front gang, because of the lighter draft required during the turn. I am aware that it is old to connect the secondary draft member to the rear gang, but heretofore, where this connection has been employed, the latch operated by the secondary draft member is also mounted on the rear gang, as shown, for example in Patent No. 2,007,062, issued July 2, 1935, to Rapp. This, however, is a less desirable position for the latch mechanism, for the dirt frequently piles up in front of the rear gang and is likely to impair the operation of the latch.

It is therefore the principal object of my invention to provide a harrow in which the secondary draft member is connected to the rear gang but the latch mechanism for automatically unlocking the gangs on a right turn, is disposed on the front gang. More specifically, the object of my invention has to do with the provision of means actuated by the secondary draft member for unlatching the holding latch on the front gang, while the draft force is exerted upon the rear gang of disks.

These and other objects and advantages of the present invention will be apparent to those skilled in the art after a consideration of the following detailed description of the preferred embodiment taken in conjunction with the accompanying drawing.

Figure 1:
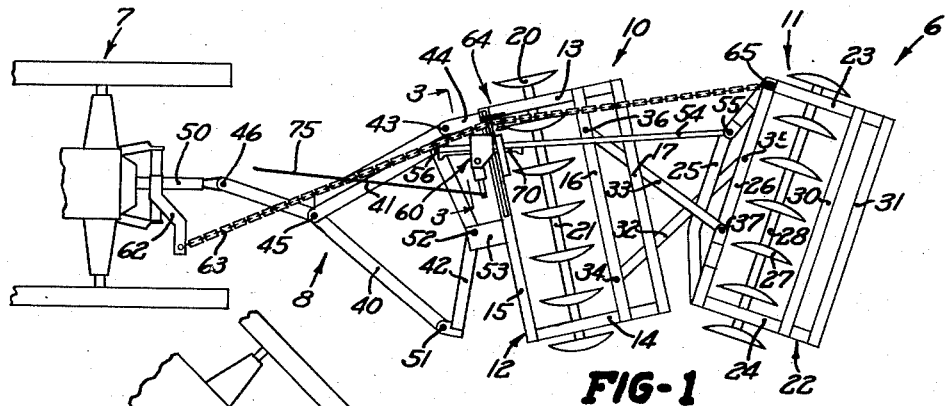
Figure 1 is a plan view of a disk harrow of the tandem offset type embodying the principle of the present invention, with the front and rear gangs thereof disposed in left hand offset operating position.

Referring now to the drawing, the harrow is indicated in its entirety by the reference numeral 6 and is adapted to be propelled by a tractor 7 through a suitable hitch frame 8. The harrow comprises the usual front or leading gang 10 and the rear or trailing gang 11. The front gang 10 includes a frame 12 which comprises parallel side members 13 and 14 connected by transverse angle iron members 15, 16 and 17, and which is provided with a plurality of concavo-convex disks 20 mounted on a transverse gang shaft 21 in laterally spaced arrangement with their concave faces all turned toward one side, preferably to the right. The two rear transverse members 16, 17 are arranged in the form of a rack for carrying stones or other weights for causing the desired penetration of the disks when operating in hard soil where the weight of the harrow alone is not sufficient to secure the desired depth of operation.

Figure 2:
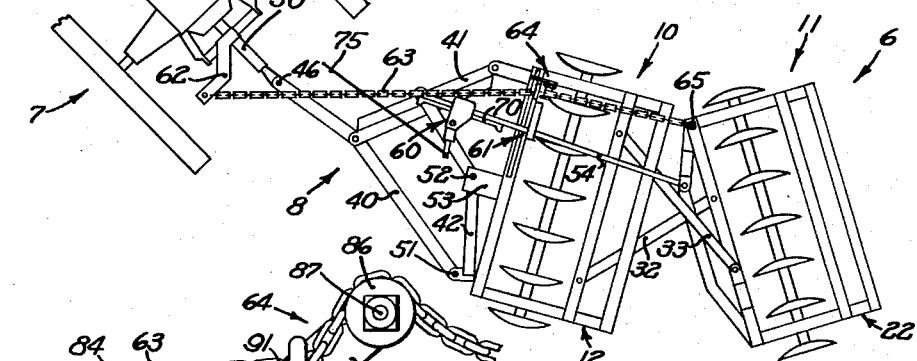
Figure 2 is a plan view of the harrow with the gangs disposed in a right hand turning position.

The frame of the rear gang 11 is indicated at 22 and comprises parallel side members 23 and 24 and transverse members 25, 26, 30 and 31 arranged in generally rectangular fashion as shown in Figures 1 and 2. A plurality of concavo-convex disks 27 is mounted on a transverse gang shaft 28 with their concave faces turned in the opposite direction to the front gang disks, that is, to the left, in the embodiment shown. A weight rack similar to that provided on the front gang is formed by the transverse members 30, 31 for applying additional weight to the rear gang.

The rear gang frame 22 is coupled to the front gang frame 12 by means of a pair of cross links 32 and 33 to permit the gangs to swing to and from angled or working position. Cross links 32 and 33 are connected in spaced relation to the front gang member 16 at the pivots 34 and 36, and are connected in spaced relation to the rear gang member 26 at the pivots 35 and 37.

The hitch frame 8, by which the tractor 7 draws the implement 6, comprises a generally longitudinal draft member 40, an offset adjustment bar 41, and a transverse rear hitch member 42. The offset adjustment bar 41 is adjustable in length in a manner well understood in the art and is pivotally connected at a pivot 43 to bracket member 44 fixed to the right end of the front gang member 15 and extending forwardly therefrom. The other end of the offset adjustment bar 41 is pivotally connected at 45 to the longitudinal draft member 40, and the latter extends forwardly therefrom. The front end of the member 40 is connected by a vertical pivot bolt 46 to the draw bar 50 of the tractor 7. The rear end of the member 40 is pivotally connected at 51 to the left end of the transverse hitch member 42, and the latter is pivotally connected intermediate its ends by a pivot bolt 52 to a bracket member 53 extending forwardly from the front gang frame member 15.

The front and rear gangs are spread apart and held in angular relation, as shown in Figure 1, by means of an angling bar 54 which is pivotally connected to the rear gang frame member 25 at 55 and extends forwardly therefrom to a pivotal connection at 56 with the free end of the transverse hitch member 42. An adjustable limit stop, indicated generally by the reference numeral 60, is carried on the angling bar 54 and bears against the front gang to prevent further rearward motion of the angling bar 54, thus insuring that the gangs arrange themselves at the proper predetermined angle each time that the tractor straightens out of a turn. The construction and operation of this type of limit stop are described in detail in the above mentioned Mitchell and Sjogren application. The limit stop 60 is locked to the front gang 10 by means of latch mechanism, indicated generally by the reference numeral 61, to be described in more detail hereinafter, and means have been provided for disabling the locking device 61 simultaneous with the turning of the tractor 7.

A turning bar 62 is fixed to the tractor draft frame and extends laterally relative to the pivotal connection 46 in the direction (left, in the embodiment illustrated) opposite the turning direction with which my invention is primarily concerned. A chain 63 or other suitable flexible draft means is connected to the outer end of the turning bar 62 and passes rearwardly therefrom through tripping mechanism, indicated generally by the reference numeral 64, and is connected at 65 to the right end of the rear gang frame member 26.

Figure 4:
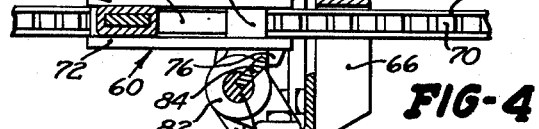
Figure 4 is a sectional view taken along the line 4—4 of Figure 3.
Figure 3:
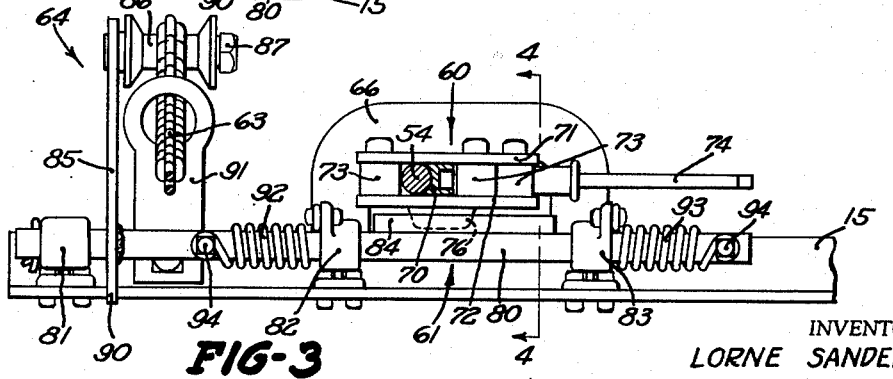
Figure 3 is an enlarged fragmentary view taken along the line 3—3 of Figure 1, of the latch mechanism.

Coming now to that portion of the implement with which my invention is more particularly concerned, the latch mechanism 61 and tripping mechanism 64 are carried on the transverse member 15 of the front gang 10. Also fixed to the angle iron 15 adjacent the latch mechanism 61 is a guide member 66 comprising an angle iron bent in the shape of an inverted U. The angling bar 54 is adapted to pass through the aperture thus formed and is provided with a rack portion 70 fixed thereto and adapted to hold the limit stop 60 in a fixed position relative to the bar 54. The limit stop 60 preferably includes a pair of spaced plates 71 and 72 between which rollers 73 are mounted to ride upon the angling bar 54 and rack portion 70. Carried between the plates 71, 72 is a pawl (not shown) adapted to engage in the teeth of the rack 70. The pawl is actuated by a lever arm 74 which is pivotally connected to the plates 71, 72 and which is controlled by a trip cord 75 fastened to one end thereof and extending forwardly to the tractor within convenient reach of the operator. The angling bar 54 is thus held against rearward movement relative to the front gang by the limit stop 60 which abuts against the guide member 66. Forward movement of the bar 54 is prevented by a stop lug 76 provided on the under surface of the limit stop 60. The lug 76 is engaged by the latch mechanism 61, which preferably comprises a transverse rod 80 journaled in three laterally spaced bearing brackets 81, 82 and 83 bolted to the horizontal flange of the angle iron member 15. A stop 84, preferably in the form of a feather key, is provided on the shaft 80 to engage the lug 76 and hold the limit stop 60 and angling bar 54 against moving forwardly therefrom. A trip lever 85 is fixed to the rod 80 and extends upwardly and rearwardly therefrom and is provided at its end with a laterally disposed spool 86 journaled on a spindle 87. A small lug 90 extends downwardly from the rod 80 and engages the edge of the angle iron 15 to limit counter-clockwise movement, as shown in Figure 4. An eye bolt 91 is fixed to the angle iron 15 directly ahead of the spool 86 and serves as a guide for the chain 63. The chain passes through the eye of the eye bolt 91 and is trained up over the spool 86, extending rearwardly therefrom to the rear gang 11.

When the tractor is in normal operating position, as shown in Figure 1, the chain 63 is slack and the only force exerted downwardly on the lever arm 85 is the weight of the chain depending between the roller 86 and the rear gang connection 65. This relatively small rotative force is resisted by a pair of coil springs 92 and 93 which are anchored to the bearing brackets 82 and 83, respectively, and are connected by bolts 94 to the rod 80. When the tractor turns to the right, however, as shown in Figure 2, the turning bar 62 exerts a pull on the rear gang 11 through the chain 63 and this pull is momentarily resisted by the latch mechanism 61 which locks the angling bar 54 to the front gang. As the chain 63 becomes taut it tends to straighten out thereby exerting a downward force on the roller 86 and lever arm 85. This causes the rod 80 to rotate in a clockwise direction (Figure 4) disengaging the stop 84 from the lug 76. The turning bar 54 is now free to move forwardly relative to the front gang 10 and the pull exerted by the chain 63 on the right end of the rear gang 11 causes the rear gang to swing in a counter-clockwise fashion to the position shown in Figure 2. At the same time the cross links 32 and 33 swing the front gang 10 in a clockwise direction from the position shown in Figure 1 to that shown in Figure 2. The two gangs are now disposed with their axes converging to the right, and the natural tendency of the harrow is to turn about the point of intersection of these axes, thereby facilitating turning to the right. When the tractor straightens out after completing the turn, the pull on the chain 63 is relieved and the action of the hitch frame 8 causes the two gangs to swing back to their original positions. The lug 76 rides over the stop 84, turning the shaft 80 against the resistance of the springs 92, 93, and when the lug 76 has cleared the stop 84, the latter is urged back into locking position by the springs 92, 93 to hold the angling bar 54 against forward movement.

While I have described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. In a harrow comprising front and rear gangs pivotally connected together and releasable latch means for fixing said gangs in one angled position, means for swinging said gangs into an oppositely angled position comprising draft transmitting means movable relative to said front gang and connected to said rear gang, and means disposed on said front gang and responsive to movement of said draft transmitting means for releasing said latch means.

2. In a single tandem disk harrow comprising front and rear gangs, means for pivotally connecting the gangs together to permit the gangs to swing apart to angular relation, hitch means connected with the front gang, draft means connected with said hitch means and with the rear gang, and an angling bar operatively connected between the gangs, latch means carried on the front gang and operatively connected with said angling bar for holding said gangs apart to a predetermined angular relation, and means carried on the front gang and operatively engaged by said draft means to release said latch means upon turning of the draft means, to permit the gangs to swing together out of angled relation.

3. In a tractor drawn harrow comprising front and rear gangs, means for pivotally connecting the gangs together for movement into and out of angled position, and hitch means adapted to be connected to the tractor and to the front gang, an angling bar connected to the rear gang and extending forwardly therefrom, releasable latch means mounted on the front gang for connecting said angling bar to the front gang and holding said gangs apart to a predetermined angular relation, a turning bar adapted to be rigidly mounted on said tractor, flexible draft means connected between the rear gang and said turning bar and passing over said front gang, and tripping means carried on said front gang and operable by said flexible draft means for releasing said latch when the tractor is turned.

4. In a tractor drawn harrow comprising front and rear gangs, means for swingably connecting the gangs together for movement into and out of operating position diverging in one direction, hitch means adapted to be connected to a tractor and to the front gang, and means for holding said gangs in said operating position including an angling bar connected to one of said gangs, and latch mechanism connecting the angling bar with the other of said gangs, a turning bar adapted to be rigidly mounted on said tractor and extending laterally in the direction opposite said first mentioned direction, flexible draft means connected between said turning bar and the rear gang at the open end thereof, and tripping means mounted on the front gang for disabling said latch mechanism, said tripping means being actuated by tension of said draft means when the tractor is turned in the first named direction.

5. In a tractor drawn harrow comprising front and rear disk gangs, means for swingably connecting the gangs together for movement into and out of angled operating position, hitch means for connecting the harrow to a tractor, and means for holding said gangs to said operating position including an angling bar connected to the rear gang and locking means for connecting said angling bar to the front gang, tripping means for disabling said locking means comprising a lever arm pivotally supported on the front gang, operating connection between said lever arm and said locking means for disabling the latter when the lever arm is rotated, draft means for connecting said tractor with the rear gang, and means operatively connecting said draft means with said lever arm to rotate the latter when the tractor is turned.

6. In a tractor drawn harrow comprising front and rear disk gangs, means for swingably connecting the gangs together for movement into and out of angled operating position, hitch means for connecting the harrow to a tractor, and means for holding said gangs to said operating position including an angling bar connected to the rear gang and locking means for connecting said angling bar to the front gang, a trip lever pivotally connected to the front gang for swinging about a transverse axis and operable to disable said locking means, flexible draft means connecting said tractor with the rear gang, and guide means for training said draft means over said trip lever so that as the tractor is turned the draft means becomes taut and exerts force against said trip lever to disable said locking means.

7. In a tractor drawn harrow comprising front and rear disk gangs, means for swingably connecting the gangs together for movement into and out of angled operating position, hitch means for connecting the harrow to a tractor, and means for holding said gangs to said operating position including an angling bar connected to the rear gang, a limit stop adapted to be adjustably fixed along the length of said angling bar, latch mechanism for connecting said angling bar with the front gang comprising a rock shaft journaled on said front gang and having a stop adapted to engage said limit stop, a trip lever fixed to said rock shaft and extending upwardly therefrom, a roller journaled on said trip lever, flexible draft means connecting said tractor with the rear gang, and guide means for training said draft means up over said roller so that as the tractor is turned said draft means becomes taut and forces said trip lever down to disengage said stop from said limit stop.

8. In a tractor drawn harrow comprising front and rear disk gangs, means for swingably connecting the gangs together for movement into and out of angled operating position, hitch means for connecting the harrow to a tractor, and means for holding said gangs to said operating position including an angling bar connected to the rear gang, a limit stop adapted to be adjustably fixed along the length of said angling bar, latch mechanism for connecting said angling bar with the front gang comprising a transverse rock shaft journaled on said front gang and having a stop adapted to engage said limit stop, a trip lever fixed to said rock shaft and extending upwardly and rearwardly therefrom, a roller journaled on said trip lever parallel with said rock shaft, a turning bar on said tractor, flexible draft means connected to said tractor and to the rear gang, and guide means for training said draft means up over said roller so that as the tractor is turned said draft means becomes taut and forces said trip lever down to disengage the stop from said limit stop.

LORNE SANDERS.